(12) United States Patent
Liu et al.

(10) Patent No.: US 10,637,339 B2
(45) Date of Patent: Apr. 28, 2020

(54) LINEAR VIBRATION MOTOR

(71) Applicant: Goertek Inc., Weifang, Shandong (CN)

(72) Inventors: Chunfa Liu, Weifang (CN); Fenglei Zu, Weifang (CN)

(73) Assignee: Goertek Inc., Shandong (CN)

( * ) Notice: Subject to any disclaimer, the term of this patent is extended or adjusted under 35 U.S.C. 154(b) by 55 days.

(21) Appl. No.: 15/778,840

(22) PCT Filed: May 20, 2016

(86) PCT No.: PCT/CN2016/082843
§ 371 (c)(1),
(2) Date: May 24, 2018

(87) PCT Pub. No.: WO2017/088386
PCT Pub. Date: Jun. 1, 2017

(65) Prior Publication Data
US 2018/0358880 A1 Dec. 13, 2018

(30) Foreign Application Priority Data
Nov. 25, 2015 (CN) .......................... 2015 1 0835600

(51) Int. Cl.
*H02K 33/02* (2006.01)
*H02K 1/34* (2006.01)
(Continued)

(52) U.S. Cl.
CPC .............. *H02K 33/02* (2013.01); *H02K 1/34* (2013.01); *H02K 5/04* (2013.01); *H02K 33/18* (2013.01); *F16F 2224/02* (2013.01)

(58) Field of Classification Search
CPC ........ H02K 5/225; H02K 33/00; H02K 33/02; H02K 33/04; H02K 33/06; H02K 33/08;
(Continued)

(56) References Cited

U.S. PATENT DOCUMENTS 5,896,076 A * 4/1999 van Namen .......... H01F 7/1615
335/222
2011/0018364 A1 1/2011 Kim et al.
(Continued)

FOREIGN PATENT DOCUMENTS

CN 101854108 A 10/2010
CN 101964579 A 2/2011
(Continued)

OTHER PUBLICATIONS

Wakiwaka Hiroyuki; Kato Hisayuki; Yoshimura Wataru; Fukuda Naoki; Matsuhiro Katsuhito; Ito Haruo, Vibration Generator, May 21, 2002, Teikoku Tsushin Kogyo Co LTD, JP 2002143770 (English Machine Translation) (Year: 2002).*
(Continued)

*Primary Examiner* — Alfonso Perez Borroto
*Assistant Examiner* — Alexander A Singh
(74) *Attorney, Agent, or Firm* — Alston & Bird LLP

(57) ABSTRACT

A linear vibration motor, comprising a motor housing, a stator, a vibrator and at least two sets of elastic support components which suspend the vibrator within the motor housing and which are used to support the vibrator and to provide elastic restoring force; the elastic support components are positioned between the inner wall of the motor housing and the vibrator, each set of elastic support components comprising at least two elastic supports; the elastic supports comprise each a first connection point fixedly connected to the vibrator and a second connection point fixedly connected to the inner wall of the motor housing; the structure of the elastic supports is such that same extends in a coiled manner in the direction of vibration of the vibrator, said linear vibration motor thereby providing a streamlined structure, and the elastic support components having a good
(Continued)

vibratory effect so as to give users a favorable tactile experience.

18 Claims, 2 Drawing Sheets

(51) Int. Cl.
*H02K 33/18* (2006.01)
*H02K 5/04* (2006.01)

(58) Field of Classification Search
CPC ........ H02K 33/10; H02K 33/12; H02K 33/14; H02K 33/16; H02K 33/18; H02K 35/00; H02K 35/02; H02K 35/04; H02K 35/06; H02K 7/1869; H02K 7/1876; H02K 7/1892; H02K 1/34; H02K 41/0356; H02K 5/04; B06B 1/04; B06B 1/045; B06B 1/00; B06B 2201/53; F16F 2224/02
USPC .. 310/25, 12.01, 12.02, 12.03, 12.04, 12.05, 310/12.06, 12.07, 12.08, 12.09, 12.11, 310/12.12, 12.13, 12.14, 12.15, 12.16, 310/12.17, 12.18, 12.19, 12.21, 12.22, 310/12.23, 12.24, 12.25, 12.26, 12.27, 310/12.28, 12.29, 12.31, 12.32, 12.33
See application file for complete search history.

(56) References Cited

U.S. PATENT DOCUMENTS

| 2011/0018365 A1* | 1/2011 | Kim ........................ B06B 1/045 |
| | | 310/17 |
| 2011/0062803 A1* | 3/2011 | Lee ........................ H02K 33/18 |
| | | 310/29 |

FOREIGN PATENT DOCUMENTS

| CN | 201750321 U | 2/2011 | |
| CN | 202121478 U | 1/2012 | |
| CN | 105406677 A | 3/2016 | |
| CN | 205123541 U | 3/2016 | |
| JP | 2002143770 A * | 5/2002 | |
| KR | 10-1151396 B1 | 6/2012 | |
| WO | WO-9404822 A1 * | 3/1994 | .......... F04B 39/0044 |

OTHER PUBLICATIONS

International Searching Authority, International Search Report and Written Opinion for International Application No. PCT/CN2016/082843, dated Sep. 2, 2016, 12 pages, State Intellectual Property Office of the P.R.C., China.

* cited by examiner

LINEAR VIBRATION MOTOR

CROSS-REFERENCE TO RELATED APPLICATIONS

This application is a National Stage of International Application No. PCT/CN2016/082843, filed on May 20, 2016, which claims priority to Chinese Patent Application No. 201510835600.4, filed on Nov. 25, 2015, both of which are hereby incorporated by reference in their entireties.

BACKGROUND

Technical Field

The present invention relates to the technical field of electronic products, and in particular, to a linear vibration motor.

Related Art

With the rapid development of portable consumer electronics, consumers are increasingly favoring electronic products that are lighter and thinner and have a better tactile experience, such as a handheld multimedia entertainment device, a handheld game console and a mobile phone. The linear vibration motor is generally used as an execution mechanism for tactile experience and functions for system vibration feedback. The development trend of thinner and lighter electronic products determines that vibration assemblies must also be improved towards a flatter dimension.

At present, a linear vibration motor used in an electronic product generally includes a magnetic vibrator and a spring member which are accommodated in a housing. The spring member is used to suspend the magnetic vibrator within the housing, provide a restoring force and provide a positioning guide for the magnetic vibrator. The spring member is mostly made of sheet metal, and connected between the vibrator and the housing through a connecting shaft. The connecting shaft is used to provide a supporting force for the vibrator. At the same time, due to the arrangement of the connecting shaft, it is necessary to correspondingly arrange structural members such as a bearing and a slideway on the vibrator to achieve horizontal resetting of the spring member. Therefore, the structures of the vibrator and the whole linear vibration motor are complicated, which is not convenient for the diversified design of the spring member.

BRIEF SUMMARY

The present invention aims to provide a linear vibration motor that has a simple structure and can effectively provide a supporting force and a restoring force for a vibrator.

The present invention is implemented in such a manner: a linear vibration motor comprises a motor housing, a stator, a vibrator, and at least two sets of elastic support assemblies for suspending the vibrator within the motor housing, for supporting the vibrator and for providing elastic restoring forces, wherein the elastic support assemblies are located between an inner wall of the motor housing and the vibrator, and each set of the elastic support assemblies comprises at least two elastic supports;

each of the elastic supports comprises a first connection point fixedly connected to the vibrator and a second connection point fixedly connected to the inner wall of the motor housing; and each elastic support is of a structure that extends spirally in a vibration direction of the vibrator.

As an improved solution, any of the elastic support assemblies comprises two elastic supports which are arranged crosswise and make way for each other.

As an improved solution, an orthogonal projection of each elastic support in the vibration direction of the vibrator is in the shape of a rectangle.

As an improved solution, orthogonal projections of the first connection points or the second connection points on the same side of the two elastic supports are located on diagonal lines of the rectangle.

As an improved solution, the orthogonal projections of the first connection points and the second connection points of the elastic supports in a movement direction of the vibrator are distributed at diagonal positions, or on connecting lines of diagonal lines.

As an improved solution, the first connection points and the second connection points of the two elastic supports are arranged in the middle of the side edge of the rectangle respectively and located on a horizontal straight line.

As an improved solution, the elastic support is an elastic sheet or a spring.

As an improved solution, the elastic support is of an elastic sheet structure, and the width of the elastic sheet is greater than the thickness of the elastic sheet.

As an improved solution, the elastic sheet comprises two metal material layers located on the surface and a damping material layer coupled between the two metal material layers.

As an improved solution, a damping member is arranged between the elastic support assembly and the vibrator, between the elastic support assembly and the motor housing, and/or inside the elastic gap of the elastic support assembly, respectively.

As an improved solution, the vibrator comprises at least two adjacent first permanent magnets and a magnetic conduction yoke arranged between the adjacent first permanent magnets, and adjacent ends of the two adjacent first permanent magnets have the same polarity;

the stator comprises a first coil and a magnetic conduction core arranged in the first coil; and a magnetization direction of the first permanent magnets is perpendicular to an axis direction of the first coil.

As an improved solution, the magnetic conduction yoke and the corresponding magnetic conduction core are staggered; and a horizontal distance d between the magnetic conduction yoke and the magnetic conduction core corresponding to the magnetic conduction yoke is within a numerical range of [0.1 mm, 0.3 mm].

The linear vibration motor comprises the motor housing, the stator, the vibrator, and the at least two sets of elastic support assemblies for suspending the vibrator within the motor housing, for supporting the vibrator and for providing elastic restoring forces. The elastic support assemblies are located between the inner wall of the motor housing and the vibrator, and each set of the elastic support assemblies comprises at least two elastic supports. Each of the elastic supports comprises a first connection point fixedly connected to the vibrator and the second connection point fixedly connected to the inner wall of the motor housing. The elastic support is of a structure that spirally extends in the vibration direction of the vibrator. Thus, the structure of the whole linear vibration motor is simplified, and the vibration effect of the elastic support assemblies is good to provide a user a good tactile experience.

the reference signs represent the following components: 1—motor housing; 2—vibrator; 3—elastic support assembly; 4—elastic support; 5—first connection point; 6—second connection point; 7—upper cover; 8—lower bottom plate; 9—first coil; 10—mass block; 11—first permanent magnet; 12—metal material layer; 13—damping material layer; 14—magnetic conduction yoke; 15—magnetic conduction core; 16—second permanent magnet; 17—second coil; 18—damping member 18.

DETAILED DESCRIPTION OF THE VARIOUS EMBODIMENTS

In order to make the objective, the technical solution and the advantages of the present invention more clearly, the present invention is further illustrated in details below in conjunction with the drawings and the embodiments. It should be understood that, the specific embodiments described herein are merely used to illustrate the present invention rather than limit the present invention.

Figure 1:
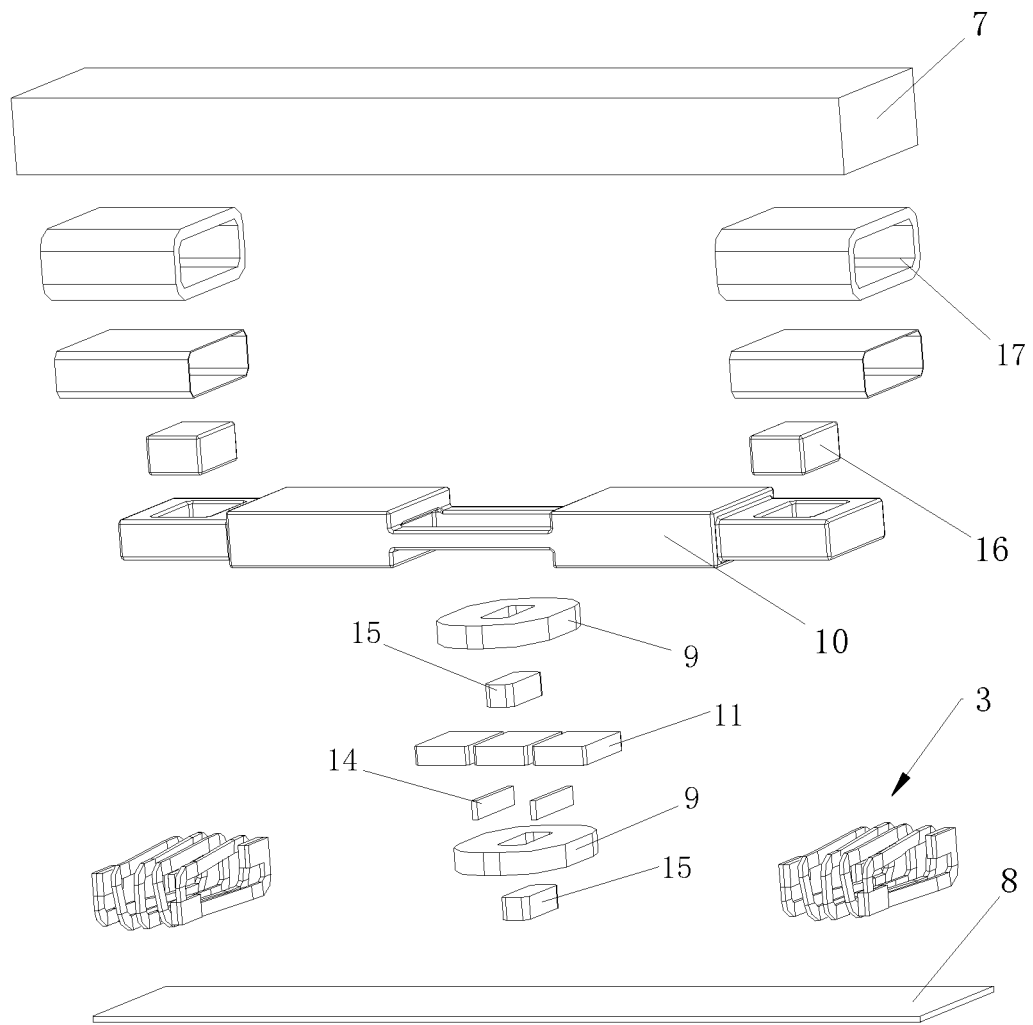
FIG. 1 is an exploded schematic structural drawing of a linear vibration motor provided by the present invention.

FIG. 1 illustrates an exploded schematic structural view of a linear vibration motor provided by the present invention, in which only parts relevant to the present invention are shown for ease of illustration.

Figure 2:
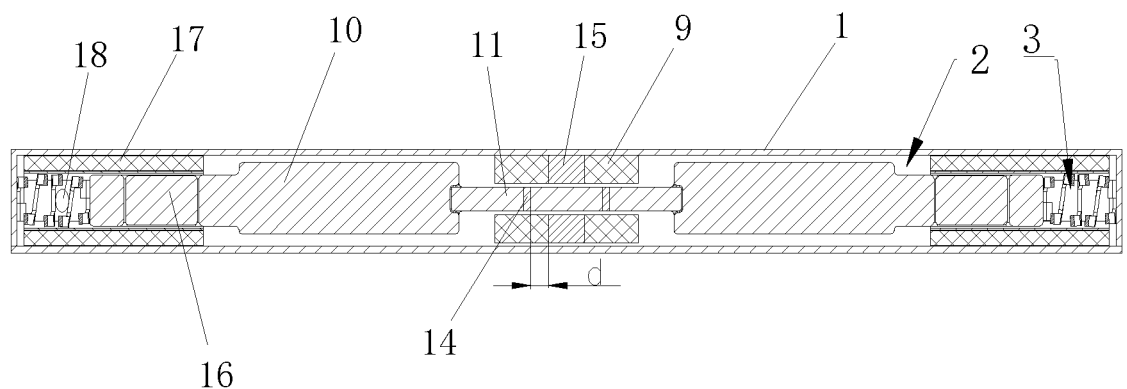
FIG. 2 is a schematic assembly view of the linear vibration motor provided by the present invention.

As shown in FIG. 2, the linear vibration motor comprises a motor housing 1, a stator, a vibrator 2, and at least two sets of elastic support assemblies 3 for suspending the vibrator 2 within the motor housing 1, for supporting the vibrator 2 and for providing elastic restoring forces, wherein the elastic support assemblies 3 are located between an inner wall of the motor housing 1 and the vibrator 2, and each set of the elastic support assemblies 3 comprises at least two elastic supports 4.

Figure 3:
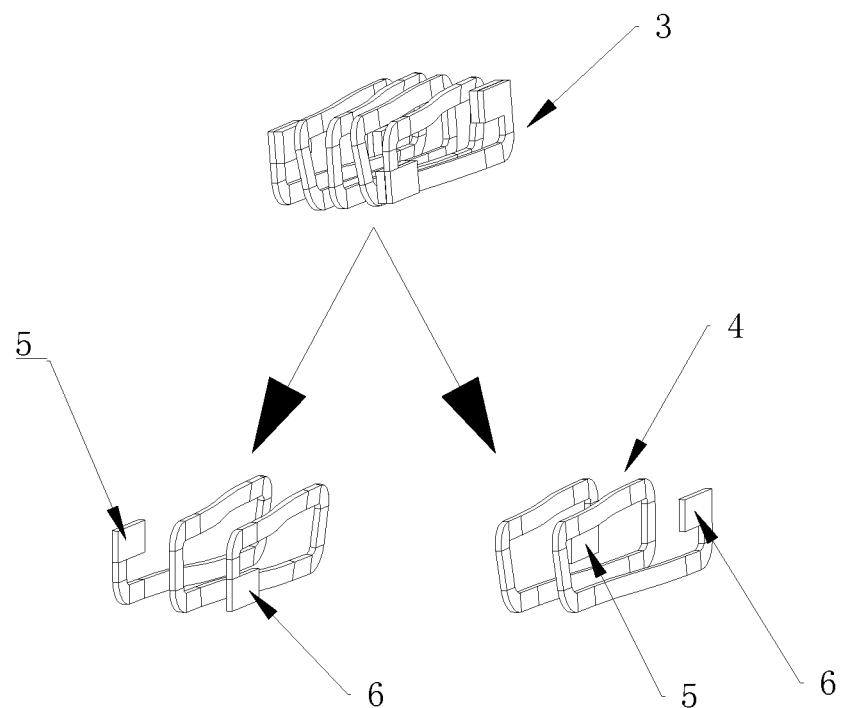
FIG. 3 is a schematic assembly view of elastic support assemblies provided by the present invention.

As shown in FIG. 3, each elastic support 4 comprises a first connection point 5 fixedly connected to the vibrator 2 and a second connection point fixedly connected to an inner wall of the motor housing 1. The first connection points 5 and the second connection points 6 marked in FIG. 3 are marked relatively and they may also be edited in reverse positions. FIG. 3 shows a stacked effect of the two elastic supports 4. If the two elastic supports 4 are placed in a slightly different manner, the positions where the two first connection points 5 and the two second connection points 6 are located are changed.

Each elastic support 4 is of a structure that extends spirally in a vibration direction of the vibrator 2. The length of the spiral extending structure may be set according to an actual vibratory tactile requirement and will not be described here.

In the present invention, the motor housing 1 comprises an upper cover 7 and a lower bottom plate 8 which are coupled together. The upper cover 7 is of a box-shape structure with an open end. The lower bottom plate 8 is of a plate-like structure. The open end of the upper cover 7 is buckled on the lower bottom plate 8. The stator is fixed on the upper cover 7 and the lower bottom plate 8. The vibrator is suspended in a space define by the upper cover 7 and the lower bottom plate 8 through the elastic support assemblies 3.

In the present invention, the vibrator 2 serves as a drive structure of the whole vibration motor, and may be set as follows.

In addition to a mass block 10, the vibrator 2 further comprises at least two adjacent first permanent magnets 11 and a magnetic conduction yoke 14 arranged between the adjacent first permanent magnets 11, and adjacent ends of the two adjacent first permanent magnets 11 have the same polarity;

the stator comprises first coils 9 and magnetic conduction cores 15 arranged in the first coils 9; and a magnetization direction of the first permanent magnets 11 is perpendicular to an axis direction of the first coil 9.

The magnetic condition yoke 14 and the corresponding magnetic conduction core 15 are staggered.

A horizontal distance d between the magnetic conduction yoke 14 and the magnetic conduction core 15 corresponding to the magnetic conduction yoke 14 is within a numerical range of [0.1 mm, 0.3 mm], i.e., a distance d as shown in FIG. 2.

In the present embodiment, as shown in FIG. 1 and FIG. 2, the vibrator 2 further comprises second permanent magnets 16 arranged on magnet mounting holes in both ends of the mass block 10. The stator further comprises second coils 17 arranged on the motor housing 1. Each second coil 17 has a cylindrical structure and is transversely arranged. The second coil 17 may be supported by fixing the coil. The second permanent magnets 16 correspond to the second coils 17.

Of course, the linear vibration motor further comprises other components and will not be described here again.

When the motor operates, an alternating current is introduced to the first coils 9 and the second coils 17. The vibrator 2 vibrates in a horizontal direction in a reciprocating manner under the interaction of the first permanent magnets 11 and the first coils 9 as well as the magnetic conduction cores 15, and under the action of the second coils 17 and the second permanent magnets 16 to generate a vibration sense.

As shown in FIG. 3, any of the elastic support assemblies 3 comprises two elastic supports 4. The elastic support assembly 3 is formed by the two elastic supports 4 crossing each other and making way for each other, that is, the two elastic supports 4 are vertically stacked, and then two connection points are formed on the side close to the vibrator 2 and are connected to the vibrator 2 respectively, for example, by welding. Another two connection points are formed on the side close to the inner wall of the motor housing 1 and are connected to the inner wall of the motor housing 1, for example, by welding.

In order to make the supporting force and the restoring force of the elastic support assemblies 3 to the vibrator 2 relatively stable and avoid polarization or damage to an electronic product, the positions of the two connection points on each side of the elastic support assembly 3 may be set and limited and will be described in detail as follows.

In the present invention, an orthogonal projection of each of the elastic supports 4 in a vibration direction of the vibrator 2 is in the shape of a rectangle. On this basis, the following settings may be made.

The orthographic projections of the first connection points or the second connection points on the same side of the two elastic supports 4 are located on the diagonal lines of the rectangle or on lines parallel to the diagonal lines, as shown in FIG. 3. That is, the two connection points may be located on two opposite diagonal lines of the rectangle of the orthographic projection, i.e., the corners of the rectangle. The two connection points may also be arranged on two side edges of the rectangle of the orthographic projection, and a connecting line between the two connection points is parallel to the corresponding diagonal line.

As shown in FIG. 3, the orthogonal projections of the first connection points 5 and the second connection points 6 of the elastic supports 4 in a movement direction of the vibrator 2 are distributed at diagonal positions of the rectangle, or on connecting lines of diagonal lines of the rectangle.

As can be seen from FIG. 3, the positions where the connection points of the two elastic supports 4 on the rectangle are reversed, that is, the elastic supports 4 need to be rotated correspondingly, and then they can be overlapped, as shown in FIG. 3.

In the present invention, the first connection points 5 and the second connection points 6 of the two elastic supports 4 are arranged in the middle of the side edge of the rectangle respectively and are located on a horizontal straight line, i.e., a connecting line between the first connection point 5 and the corresponding second connection point 6 is parallel to the vibration direction of the vibrator 2.

That is, the two connection points on one side of the elastic support assemblies 3 are located on a median line of the side edges of the rectangle of the orthographic projection, and will not be described herein.

In the present invention, the upper elastic support member 4 is of an elastic sheet structure or a spring.

Figure 4:
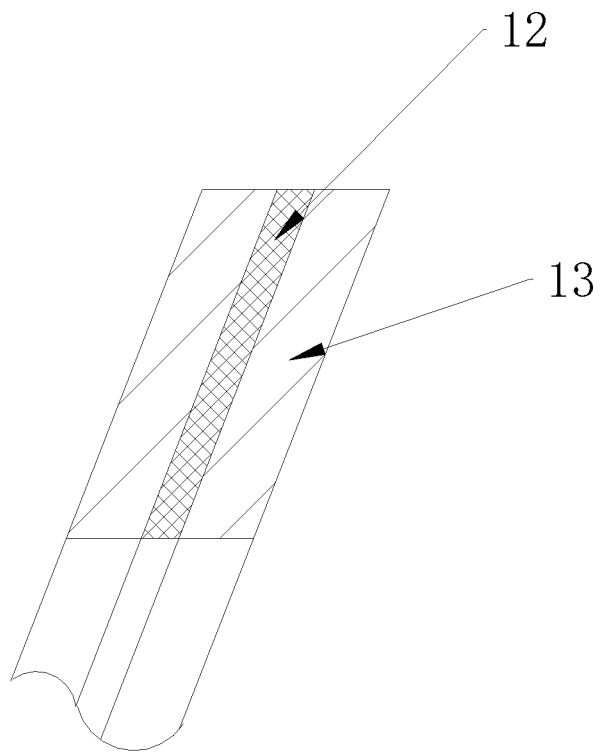
FIG. 4 is a schematic structural view of an elastic sheet provided by the present invention.

When the elastic support 4 is an elastic sheet, the elastic sheet comprises two metal material layers 12 on the surface and a damping material layer 13 coupled between the two metal material layers 12, such that the elasticity of the whole elastic support assemblies 3 is improved. As shown in FIG. 4, the two metal material layers 12 and the damping material 13 are combined into a whole by a gluing or hot pressing process.

In the present invention, in order to further improve the vibration effect of the vibrator 2, the following settings may be made.

A damping member 18 is arranged between the elastic support assembly 3 and the vibrator 2, between the elastic support assembly 3 and the motor housing 1, and/or inside the elastic gap of the elastic support assembly 3 respectively. The damping member 18 may be made of a conventional damping material, as shown in FIG. 2.

In the present invention, when the elastic support is of an elastic sheet structure, in order to increase the supporting force of the whole elastic support assembly 3, the width of the elastic sheet may be set to be larger than the thickness of the elastic sheet, that is, as shown in FIG. 3, the height of the rectangle of the orthogonal projection of the elastic sheet is greater than the thickness of the material used for the elastic sheet itself, which will not be described here.

In the present invention, the linear vibration motor comprises the motor housing 1, the stator, the vibrator 2, and at least two sets of elastic support assemblies 3 for suspending the vibrator 2 within the motor housing 1, for supporting the vibrator 2 and for providing elastic restoring forces. The elastic support assemblies 3 are located between the inner wall of the motor housing 1 and the vibrator 2, and each set of the elastic support assemblies 3 comprises at least two elastic supports 4. Each of the elastic supports 4 comprises the first connection point 5 fixedly connected to the vibrator 2 and the second connection point 6 fixedly connected to the inner wall of the motor housing 1. Each elastic support 4 is a structure that spirally extends in the vibration direction of the vibrator 2. Thus, the structure of the whole linear vibration motor is simplified, and the vibration effect of the elastic support assemblies 3 is good to provide a user a good tactile experience.

The above-mentioned embodiments are just preferred embodiments of the present invention and are not intended to limit the present invention. Any modifications, equivalent replacements and improvements made within the spirit and principle of the present invention should be included within the protection scope of the present invention.

What is claimed is:

1. A linear vibration motor comprising:
   a motor housing;
   a stator;
   a vibrator; and
   at least two sets of elastic support assemblies for suspending the vibrator within the motor housing, for supporting the vibrator and for providing elastic restoring forces,
   wherein:
   the elastic support assemblies are located between an inner wall of the motor housing and the vibrator, and each set of the elastic support assemblies comprises two elastic supports, the two elastic supports being arranged crosswise and to make way for each other,
   the elastic support comprises a first connection point fixedly connected to the vibrator and a second connection point fixedly connected to the inner wall of the motor housing, and
   the elastic support is of a structure extending spirally in a vibration direction of the vibrator.

2. The linear vibration motor according to claim 1, wherein an orthographic projection of the elastic support in the vibration direction of the vibrator is in the shape of a rectangle.

3. The linear vibration motor according to claim 2, wherein orthographic projections of the first connection points or the second connection points on the same side of the two elastic supports are located on diagonal lines of the rectangle or lines parallel with the diagonal lines.

4. The linear vibration motor according to claim 2, wherein orthogonal projections of the first connection points and the second connection points of the elastic supports in a movement direction of the vibrator are distributed at diagonal positions, or on connecting lines of the diagonal lines.

5. The linear vibration motor according to claim 1, wherein the elastic support is an elastic sheet or a spring.

6. The linear vibration motor according to claim 5, wherein the elastic support is of an elastic sheet structure, and the width of the elastic sheet is greater than the thickness of the elastic sheet.

7. The linear vibration motor according to claim 5, wherein the elastic sheet comprises two metal material layers respectively located on the two surfaces of the elastic sheet and a damping material layer coupled between the two metal material layers.

8. The linear vibration motor according to claim 1, wherein a damping member is arranged in an elastic space between the elastic support assembly and the vibrator, between the elastic support assembly and the motor housing, and/or inside the elastic support assembly.

9. The linear vibration motor according to claim 1, wherein the vibrator further comprises at least two adjacent first permanent magnets and a magnetic conduction yoke arranged between the adjacent first permanent magnets, and adjacent ends of the two adjacent first permanent magnets have the same polarity;

the stator comprises a first coil and a magnetic conduction core arranged in the first coil; and a magnetization direction of the first permanent magnets is perpendicular to an axis direction of the first coil.

10. The linear vibration motor according to claim 9, wherein:

the magnetic conduction yoke and the magnetic conduction core are staggered, and a horizontal distance d between the magnetic conduction yoke and the magnetic conduction core corresponding to the magnetic conduction yoke is within a numerical range of [0.1 mm, 0.3 mm].

11. A linear vibration motor comprising:

a motor housing;

a stator comprising a first coil and a magnetic conduction core arranged in the first coil;

a vibrator comprising at least two adjacent first permanent magnets and a magnetic conduction yoke arranged between the adjacent first permanent magnets, and adjacent ends of the two adjacent first permanent magnets have the same polarity; and at least two sets of elastic support assemblies for suspending the vibrator within the motor housing, for supporting the vibrator and for providing elastic restoring forces, wherein:

the elastic support assemblies are located between an inner wall of the motor housing and the vibrator, and each set of the elastic support assemblies comprises at least two elastic supports, the elastic support comprises a first connection point fixedly connected to the vibrator and a second connection point fixedly connected to the inner wall of the motor housing, the elastic support is of a structure extending spirally in a vibration direction of the vibrator, a magnetization direction of the first permanent magnets is perpendicular to an axis direction of the first coil, the magnetic conduction yoke and the magnetic conduction core are staggered, and a horizontal distance d between the magnetic conduction yoke and the magnetic conduction core corresponding to the magnetic conduction yoke is within a numerical range of [0.1 mm, 0.3 mm].

12. The linear vibration motor according to claim 11, wherein an orthographic projection of the elastic support in the vibration direction of the vibrator is in the shape of a rectangle.

13. The linear vibration motor according to claim 12, wherein orthographic projections of the first connection points or the second connection points on the same side of the two elastic supports are located on diagonal lines of the rectangle or lines parallel with the diagonal lines.

14. The linear vibration motor according to claim 12, wherein orthogonal projections of the first connection points and the second connection points of the elastic supports in a movement direction of the vibrator are distributed at diagonal positions, or on connecting lines of the diagonal lines.

15. The linear vibration motor according to claim 11, wherein the elastic support is an elastic sheet or a spring.

16. The linear vibration motor according to claim 15, wherein the elastic support is of an elastic sheet structure, and the width of the elastic sheet is greater than the thickness of the elastic sheet.

17. The linear vibration motor according to claim 15, wherein the elastic sheet comprises two metal material layers respectively located on the two surfaces of the elastic sheet and a damping material layer coupled between the two metal material layers.

18. The linear vibration motor according to claim 11, wherein a damping member is arranged in an elastic space between the elastic support assembly and the vibrator, between the elastic support assembly and the motor housing, and/or inside the elastic support assembly.

* * * * *